UNITED STATES PATENT OFFICE.

GEORGE W. LARAWAY, OF NEW YORK, N. Y., ASSIGNOR TO NATIONAL PACKAGE COMPANY, OF GLENS FALLS, NEW YORK.

FIBROUS COMPOSITION OF MATTER.

SPECIFICATION forming part of Letters Patent No. 670,081, dated March 19, 1901.

Application filed March 25, 1899. Serial No. 710,451. (No specimens.)

*To all whom it may concern:*

Be it known that I, GEORGE W. LARAWAY, a citizen of the United States, residing at New York, in the county and State of New York, have invented new and useful Improvements in Fibrous Composition of Matter, of which the following is a specification.

This invention relates to that class of hard and tough fibrous compositions of matter which are composed mainly of a finely-comminuted fibrous substance and a fusible cementing agent—for instance, rosin or other resinous matter—which ingredients are united by intimately mixing them and subjecting the mixture to heat and pressure.

The object of this invention is to produce a composition of matter of this general character which is capable of resisting cold water and oil and which is suitable for the manufacture of vessels and other articles which are in their use liable to be exposed to the action of cold water and oil, but are not liable to be exposed to hot water.

In practicing my invention I intimately mix in a dry state finely-reduced fibrous matter, a powdered fusible cementing agent—for instance, rosin or other resinous matter—and plaster-of-paris, and then press the mixture under the application of a sufficient degree of heat to fuse the cementing agent and unite the particles.

The particular fibrous material which is employed may vary in different cases and localities in accordance with the available supply of such material, its cost, and the character of the articles which are to be manufactured from the composition. For illustration waste paper can be advantageously used by reducing or comminuting the same in a suitable cutting or pulverizing machine to a fine, fluffy, or flocky condition. Cornstalks, bagasse, palmetto-root, and many other fibrous substances or materials can also be employed by simply reducing the same to a fine condition and without undergoing any other treatment. When a fireproof substance is desired, fibrous minerals, such as asbestos or mica, can be employed, and for some purposes a mixture of vegetable and mineral fibrous materials can be advantageously used. This finely-reduced fibrous matter is then intimately mixed with the powdered cementing ingredient and plaster-of-paris. This can be conveniently done by placing the lumps of rosin or other resinous matter in an ordinary tumbling-barrel, together with the reduced fibrous matter and the plaster-of-paris, and so pulverizing the cementing ingredient while mixing it with the other ingredients. I prefer to employ the reduced fibrous matter, the cementing ingredient, and the plaster-of-paris in equal parts; but this proportion may be varied according to the nature of the materials and the desired ultimate product or article. The resulting dry fluffy mixture is then compressed, preferably by a hydraulic press, under the application of a sufficient degree of heat to fuse or melt the cementing agent, whereby a hard and tough material is produced, which is suitable for the manufacture of a great variety of articles and which is not disintegrated by cold water. The plaster-of-paris used in the composition renders the same particularly hard and firm. By using vegetable fiber—such as waste paper, wood-pulp, cornstalks, bagasse, &c.—as the fibrous ingredient a material is produced which is very useful for barrels, kegs, and other vessels and articles which are used for dry materials and not liable to be exposed to the action of hot water—for instance, barrels for flour, cement, salt, &c. The composition is also well adapted for vessels designed for holding materials which contain oil as an ingredient—for instance, for the manufacture of paint-kegs.

Pigments can be mixed with the ingredients for giving the composition throughout the desired color, or such pigments can be dusted on the dies in which the material is pressed for facing the composition with the desired color. The dry fluffy mixture can be pressed directly and in one operation into the desired form of the article which is desired to be produced.

I claim as my invention—

1. The herein-described hard and tough composition of matter consisting of finely-reduced fibrous matter, plaster-of-paris and a fused resinous cementing agent, substantially as set forth.

2. The herein-described hard and tough composition of matter consisting of finely-reduced fibrous matter, plaster-of-paris and fused rosin, substantially as set forth.

Witness my hand this 22d day of March, 1899.

GEORGE W. LARAWAY.

Witnesses:
WM. E. SPEER,
HERBERT L. SELLECK.